Aug. 4, 1970          J. A. ALGER, JR., ET AL          3,523,285
     TRANSDUCING HEAD ASSEMBLY AND FORWARD CANTILEVERED BEARING PAD
Filed Nov. 2, 1967                                4 Sheets-Sheet 1
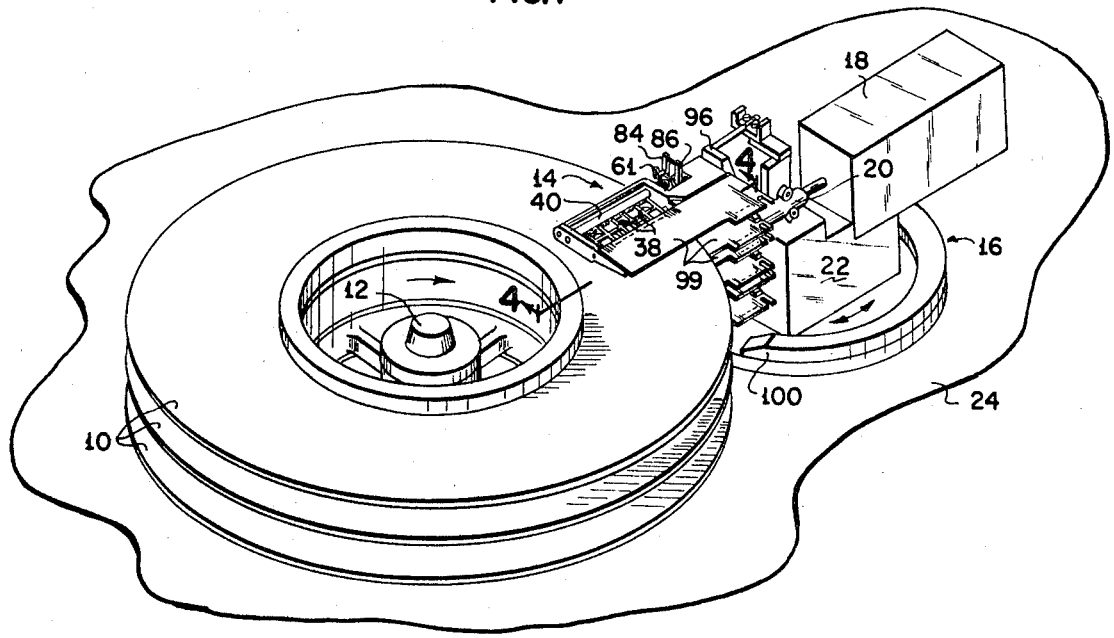
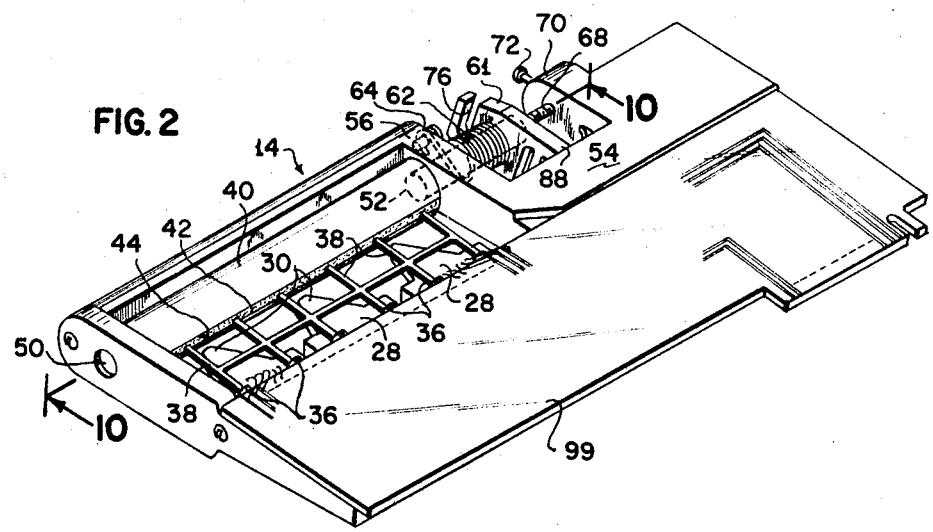
INVENTORS
JAMES A. ALGER, JR.
JOHN J. MIYATA
BY  *Louis A. Kline*
    *John J. Matlago*
    *Robert L. Harrington*
    THEIR ATTORNEYS

INVENTORS
JAMES A. ALGER, JR.
JOHN J. MIYATA

BY *Louis A. Kline*
*John J. Matlago*
*Robert L. Harrington*
THEIR ATTORNEYS

Aug. 4, 1970  J. A. ALGER, JR., ET AL  3,523,285
TRANSDUCING HEAD ASSEMBLY AND FORWARD CANTILEVERED BEARING PAD
Filed Nov. 2, 1967  4 Sheets-Sheet 3

INVENTORS
JAMES A. ALGER, JR.
JOHN J. MIYATA

BY Louis A. Kline
John J. Matlago
Robert L. Harrington
THEIR ATTORNEYS

INVENTORS
JAMES A. ALGER, JR.
JOHN J. MIYATA

BY
THEIR ATTORNEYS

United States Patent Office 3,523,285
Patented Aug. 4, 1970

3,523,285
TRANSDUCING HEAD ASSEMBLY AND FORWARD CANTILEVERED BEARING PAD
James A. Alger, Jr., Torrance, and John J. Miyata, Monterey Park, Calif., assignors to The National Cash Register Company, Dayton, Ohio, a corporation of Maryland
Filed Nov. 2, 1967, Ser. No. 680,098
Int. Cl. G11b 5/60
U.S. Cl. 340—174.1                                    10 Claims

ABSTRACT OF THE DISCLOSURE

A transducing head assembly wherein a plurality of magnetic transducing heads are mounted together to form a transducing head unit with a flying pad cantilevered forward of the head unit. The head unit is affixed to one end of each of a pair of leaf springs and the other ends of the springs are affixed to, and extend radially from, a supporting rod. The supporting rod is mounted in an assembly bracket so as to have rotatable movement about its axis and means are provided to control the rotative position of the rod. By rotating the rod, the leaf springs are pivoted toward or away from a rotating disc to thereby position the magnetic heads into or out of engagement with the recording surface of the disc. The flying pad has a beveled leading surface portion forming an air foil that causes the pad to fly over the moving layer of air produced by the rotating disc. The moving air layer is accordingly directed under the head unit to urge the heads away from the disc surface. Proper balance of the lifting force and the loading force of the leaf springs supports the heads at a desired distance from the recording surface.

HISTORY OF INVENTION

Figure 3:
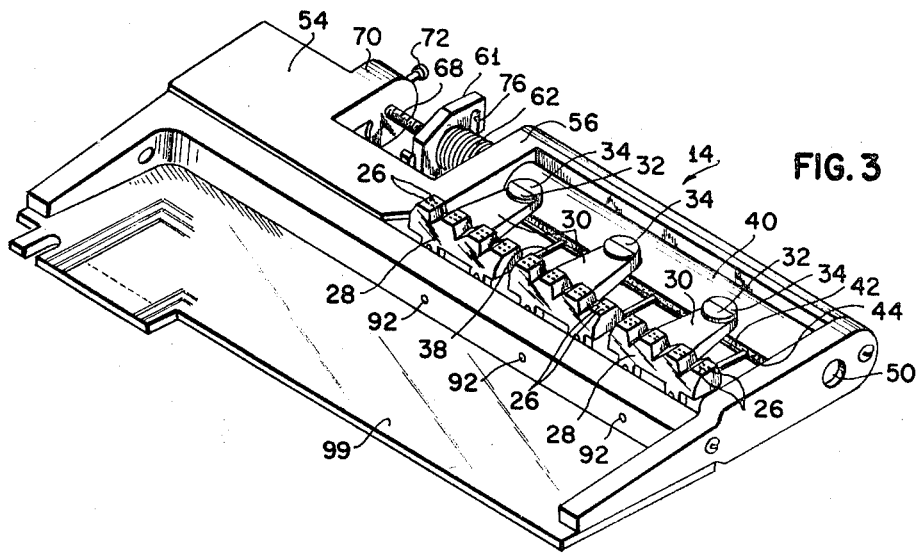

Head assemblies designed for causing magnetic transducing heads to ride on a moving air layer produced by a rotating disc surface are common in the magnetic recording art. Whereas a direct contact of the heads on the disc surface can damage both the disc surface and the magnetic heads, and whereas it is not necessary that such contact be achieved for magnetic read/write recording, it is preferable to use the flying head principle.

Although magnetic read/write recording can be achieved with the magnetic heads spaced from the disc surface, the spacing must be very small, e.g., less than about 80 to 100 microinches. The quality and reliability of the recording are reduced when the spacing is increased. The thickness of the air film is about 500 to 2000 microinches and thus, it is desirable for a flying head assembly to include means to force the heads to the desired depth within the air layer. It will be understood that although the heads should never be permitted to directly contact the recording surface, they should be held at all times within the established spacing limits.

It is common in flying head assemblies for the head unit carrying the magnetic transducing heads to have its leading edge beveled in such a manner as to form an air foil that forces the air layer under the magnetic heads. To maintain the desired close spacing between the heads and the disc, it is common to provide a biasing means that produces a controlled urging of the head unit into the moving air layer. It will be understood that a balance of forces must be maintained with a constant predictable spring biasing force offsetting a similarly constant and predictable reactive force of the air foil acting against the moving air layer. Whereas the lifting force acting on the underside of the head unit is largely dependent on the angular disposition of the head unit to the moving air layer, not only must the beveled edge of the head unit be formed to induce the proper lifting force, it must also provide stability to the angular disposition of the head unit. Such precision in the formation of the bevel on the head unit is both difficult to attain and is very costly. Furthermore, any variation in the air layer (e.g., as may be caused by even slight irregularities in the disc surface) can affect the lifting force being applied against the beveled edge. This will upset the balance of the forces so as to change the angular disposition of the head unit and thereby quickly magnify the change in the lifting force, causing the transducing heads to crash into the disc surface or bounce out of the spacing limits.

It is therefore an object of the present invention to provide an improved flying head assembly wherein the construction provides greater reliability resulting in substantially reduced dangers of damaging the heads and/or disc surface, while having less rigid manufacturing requirements resulting in a reduction in the cost of manufacture.

In general, the preferred embodiment of the present invention comprises a head assembly having a flying pad cantilevered forward of the head unit carrying the transducing heads. The flying pad has a beveled leading surface portion that produces the air foil which causes the flying pad and interconnected head unit to fly in the air layer. The head unit is connected to a biasing means which forces the transducing heads of the head unit into the air layer to the desired spacing from the disc surface. Whereas the lifting force against the flying pad may vary slightly (due, for example, to disc irregularities or the like) and cause a slight dip or rise in the flying pad relative to the disc surface, there is almost no effect on the lifting force produced under the head unit.

The biasing means preferably comprises a leaf spring connecting the head unit to a rotatable rod. When the rod is rotated in one direction, the leaf spring and connected head unit are biased toward the disc surface (loaded position) and when rotated in the other direction, the head unit is biased away from the disc surface (retracted or unloaded position).

Figure 4:
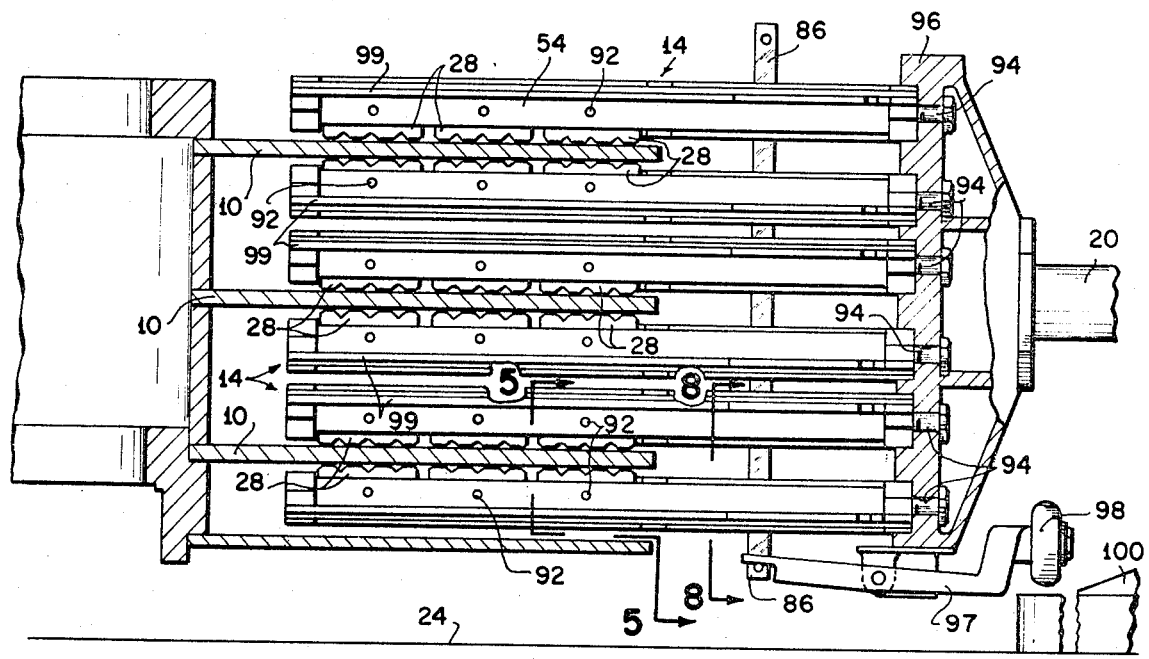
Figure 5:
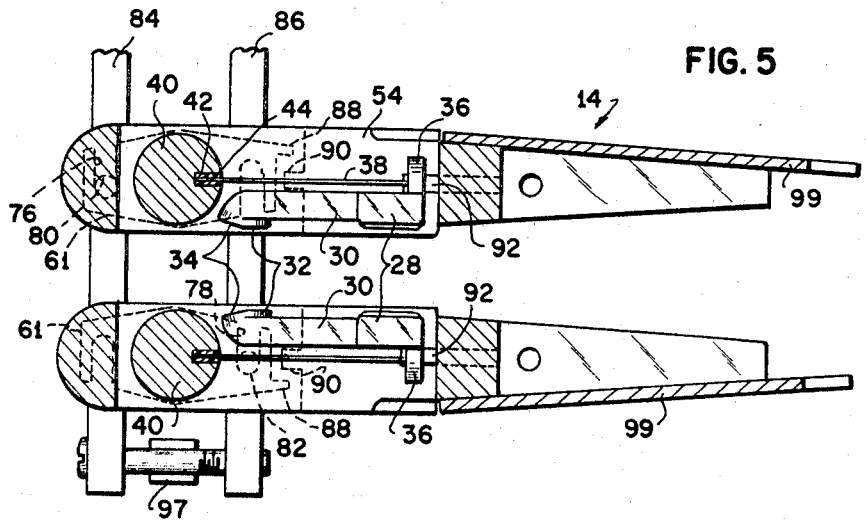
Figure 6:
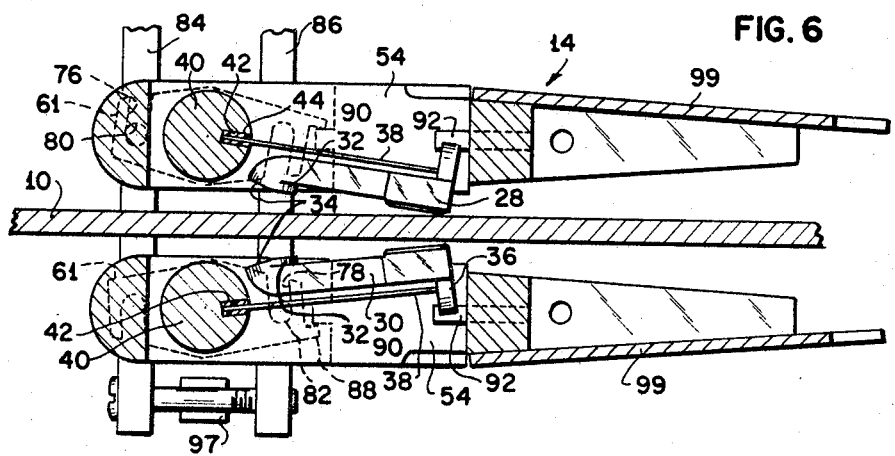
Figure 7:
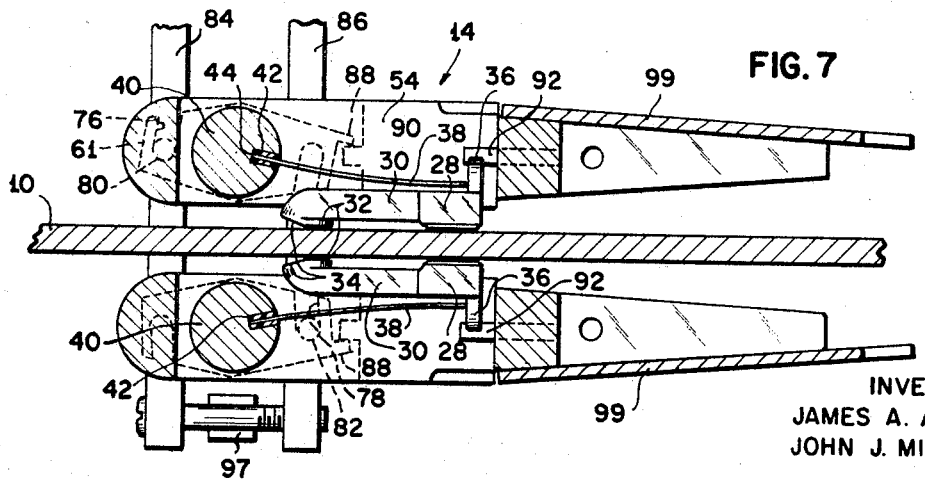
Figure 8:
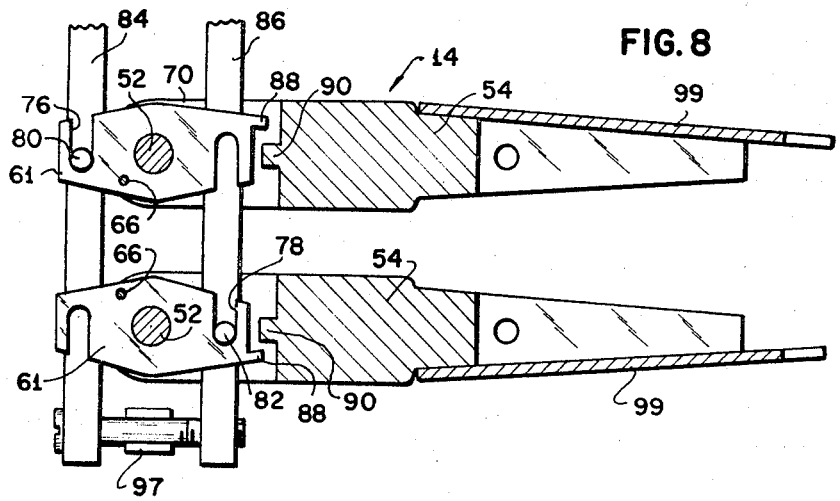
Figure 9:
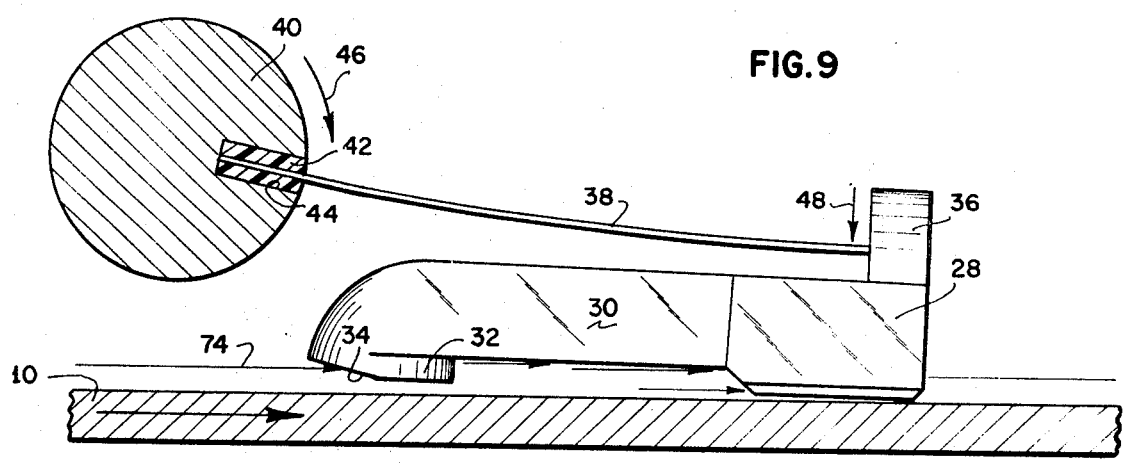
Figure 10:
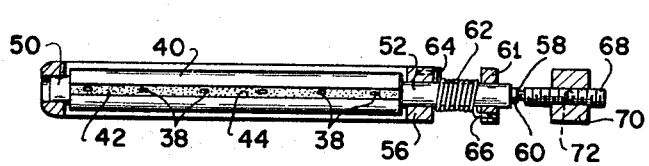

Other advantages and improvements provided by the apparatus of the present invention will become more apparent by reference to the following detailed description and drawings wherein:

FIG. 1 is a perspective view of a transducing apparatus incorporating one embodiment of the present invention;
FIG. 2 is a top perspective view of a flying head assembly in accordance with the present invention as used in the apparatus of FIG. 1;
FIG. 3 is a bottom perspective view of the flying head assembly shown in FIG. 2;
FIG. 4 is a sectional view taken on line 4—4 of FIG. 1 showing the control mechanism for loading and unloading the transducing heads of the flying head assembly shown in FIGS. 2 and 3;
FIG. 5 is a sectional view as taken on line 5—5 of FIG. 4 showing the transducing heads in an unloaded position;
FIG. 6 is a sectional view similar to FIG. 5 showing the transducing heads in an intermediate position of being moved into a loaded position from an unloaded position;
FIG. 7 is a sectional view similar to FIGS. 5 and 6 showing the transducing heads in a loaded position;
FIG. 8 is a sectional view taken on lines 8—8 of FIG. 4 showing in more detail a portion of the control means for positioning the transducing heads;
FIG. 9 schematically illustrates the operation of the flying head assembly while performing the transducing operations on a rotating disc; and
FIG. 10 is a cross-sectional view of a part of the mechanism for loading and unloading the transducing heads from the recording surface as taken on lines 10—10 of FIG. 2.

FIG. 1 of the drawings schematically illustrates a transducing apparatus for performing transducing read/write operations on a plurality of magnetic recording discs 10. The discs 10 are mounted for rotatable movement on a driven hub 12, the construction of which can take a number of forms known to the art. Although the type of construction selected for the driven hub 12 is not important to the function of the present invention, a preferred construction is disclosed in the commonly assigned U.S. application Ser. No. 597,156, titled "Interchangeable Disc Assembly," filed Nov. 25, 1966 in the name of Stephen R. Klinger et al.

The transducing operations are performed by the transducing head assemblies 14, the position for which is controlled by a positioning mechanism 16. The positioning mechanism is composed of a sixteen position actuator 18 connected to the head assembly through a connecting rod 20 which positions the head assembly radially with respect to the discs 10 to move the heads of the head assemblies 14 between a plurality of circular tracks provided on the surface of the discs 10. Additionally, the actuator 18 is mounted on a turret member 22 which is rotatably mounted to a platform 24 forming a part of the housing for the transducing apparatus. A more specific disclosure of a positioning mechanism suitable for the apparatus generally disclosed above can be found in the commonly assigned U.S. applications Ser. No. 585,674, now Pat. No. 3,480,936, titled "Magnetic Transducer Head Assembly," filed Oct. 10, 1966 in the names of Richard K. Gerlach et al., and Ser. No. 648,496 titled "Disc Random Access Memory System," filed June 23, 1967 in the names of Edward P. Bucklin, Jr. et al.

FIGS. 2 and 3 illustrate the head assembly 14 but without the mechanism for loading the heads, i.e., the mechanism for raising and lowering the heads with respect to the disc surface which will be further described hereafter. With specific reference to the bottom view of FIG. 3, the magnetic transducing heads 26 are mounted in transducing head units 28. A process for producing transducing heads in a manner suitable for the present invention is disclosed in the commonly assigned U.S. application Ser. No. 564,912 titled "Magnetic Head Device," filed July 13, 1966 in the name of John J. Miyata.

Integral with and projected forward of each head unit 28 is a cantilever portion 30. (See also FIG. 9.) Affixed to the forward end of the cantilever portion 30 is a disc-shaped flying pad 32. The flying pad 32 is constructed from a relatively hard metal, e.g., stainless steel, with a slight bevel 34 (e.g., an angle of about 20 minutes) lapped into the leading surface portion. The stainless steel material allows for subsequent working of the softer transducing head materials without damage to the flying pad.

As can best be seen from the schematic view of FIG. 9, the head unit 28 has lug portions 36 protruded upward from its trailing edge. Leaf springs 38 extend forwardly from lug portions 36 and are affixed to a supporting rod 40 as by embedding the end of the leaf spring 38 in a potting compound 42 provided in a radially aligned slot 44 of the supporting rod 40. As seen in FIG. 9, with the leaf springs 38 projected radially from the supporting rod 40, rotating the supporting rod 40 on its axis as indicated by the arrow 46, pivots the leaf spring 38 so as to apply the spring biasing pressure indicated by arrow 48 that urges the head unit 28 toward the surface of disc 10.

The distance that the pad is cantilevered forward of the head unit can vary. However, it has been found that to achieve the desired stabilization for the flying pad, the distance from the point where the leaf springs engage the head unit to the forward edge of the flying pad is preferably about three-fourths of an inch with the bearing surface of the flying pad 32 having a diameter of about one-fourth of an inch.

Referring now more specifically to the top view of the head assembly in FIG. 2, the supporting rod 40 is mounted for slidable and rotatable movement at connections 50 and 52 of an assembly bracket 54. As shown in FIG. 10, the supporting rod 40 at connection 52 is reduced in cross-section and is extended through the cross member 56 of the assembly bracket 54 and terminates as a flat bearing surface 58. Whereas it is desirable to provide the bearing surface with a hard metal, and whereas the remainder of the rod may be produced of a softer metal, e.g., aluminum, in the preferred embodiment a pin 60 is mounted in the end of the supporting rod 40 and provides the mentioned bearing surface 58.

A lever member 61 is locked to the end of the supporting rod 40 and a compression coil spring 62 is wrapped around the supporting rod and anchored at one end 64 to the cross member 56 of the assembly bracket 54 and at the other end 66 to the lever member 61. An adjusting screw 68 is threadably engaged with an ear portion 70 of the assembly bracket 54 and as shown in FIG. 10 is abutted against the pin 60.

The coil spring 62 is compressed between cross member 56 and lever member 61 so as to urge the supporting rod 40 against the adjusting screw 68. Thus, turning of the adjusting screw 68 relative to the ear portion 70 of the assembly bracket 54 will provide lateral shifting of the supporting rod 40 between (but restricted by) the connections 50 and 52. This adjustment provides for precise lateral positioning of the heads of the head unit 28 with respect to the recording surface of discs 10. When the proper adjustment is made it is desirable to lock the adjusting screw 68 to the ear portion 70 as by a locking pin 72.

The control mechanism for loading the heads is illustrated in the cross-sectional views of FIGS. 4 to 9. FIG. 8 shows in full lines the configuration of the lever member 61 in an unloaded position. This same position is illustrated in FIG. 5 where the head unit 28 is shown with the lever member 61 shown in broken lines. It will be understood that the pair of head assemblies shown are adapted to operate on the top and bottom surfaces of a single disc and that two additional pairs of head assemblies are required to operate on the six recording surfaces of the three discs 10 illustrated in FIGS. 1 and 4.

Referring to FIGS. 5 to 8, it will be seen that by rotating the lever member of the top head assembly units clockwise and the lever member of the bottom head assembly counterclockwise, the head units 28 will be pivoted from their unloaded position of FIGS. 5 and 8 first to an intermediate load position as shown in FIG. 6 (where the head unit 28 is pivoted against the moving air layer) and then to the full load position with the flying pads 32 pivoted into the air layer as shown in FIG. 7. (The air layer 74 is schematically illustrated in FIG. 9.)

The coil spring 62 is adapted to rotatively urge the lever member 61 to a load position with tabs 88 of the lever member 61 abutted against embossments 90 of the assembly bracket 54. Thus, the lever members 61 are provided with notches 76 and 78 that are adapted to be engaged by pins 80 and 82, respectively, carried by vertical bar members 84 and 86, respectively. As the vertical bar members 84 and 86 are forced downward, the pins 80 and 82 force rotative movement of the lever members against the coil springs 62 to unload the head units from the disc surface. Stop members 92 are provided on the assembly brackets to limit the retracting rotative movement of the head units.

Referring to FIG. 4, the assembly brackets 54 are fastened with fasteners 94 to a brace member 96 which is bolted to the connecting rod 20. A rocker arm 97 is pivotally mounted to the bottom of the brace member 96 with one end being connected to the lower ends of the vertical bars 84 and 86 (bar 84 being aligned behind bar 86 in the figure). The other end of the rocker arm 97 carries a cam follower 98 adapted to ride on the cam surface 100.

OPERATION

In the operation of the apparatus, it will be understood by reference to the general description of FIG. 1 above, that rotation of the turret member 22 counterclockwise as shown in the figure, will pivot the actuator 18 with connecting rod 20 on which is mounted the brace member 96 that carries the head assembly 14 away from the discs 10. The rocker arm 97 is mounted to the brace member 96 and the cam follower 98 carried by the rocker arm 97 engages the cam surface 100. The rocker arm 97 is accordingly pivoted counterclockwise as viewed in FIG. 4 to pull the vertical bars 84 and 86 down. The pins 80 and 82 engage the lever members 61 to pivot the supporting rods 40 against the tension of coil springs 62, thereby causing retraction of the head units 28 away from the disc surfaces to thereby unload the transducing heads.

With the head assembly pivoted clear of the discs 10, the discs can be stopped for servicing or replaced with other discs, etc. When ready for operation, the discs are again set into a high speed rotating movement thereby producing the air layer 74 illustrated in FIG. 9. The turret member 22 is pivoted clockwise to place the head assembly in place over the discs 10. The cam follower 98 of the rocker arm 97 is moved off the cam surface 100 to permit the vertical bars 84 and 86 to be moved upward in response to the bias of the coil springs 62. The supporting rod 40 is accordingly permitted to rotate, pivoting leaf springs 38 and head unit 28 toward the disc surface. As previously described, the head unit 28 first contacts the air layer 74 and pivots the flying pad 32 onto the air layer as shown in FIG. 9. The heads are then in position for the transducing operation as controlled through circuit board 99 interconnecting the heads with the electronic controls.

It has been found that the above-described apparatus is considerably more reliable in operation than previous structures. This reliability is believed to be achieved, at least in part, because the flying pad dictates the angular disposition of the head unit and it is removed from the direct effect of the spring biasing force. In the previous devices with the angular disposition of the head unit being dependent on the beveled lead edge, a very fine balance between the reactive forces had to be maintained, whereas in the present device, the lifting force acting against the flying pad can be sufficiently greater than the effective force of the leaf springs to provide a substantially stabilized flying angle for the head unit.

While there have been shown, described and pointed out the fundamental novel features of the invention, as applied to the preferred embodiments, it will be understood that various omissions, substitutions and changes in the form and details of the device illustrated and in its operation may be made by those skilled in the art, without departing from the scope and spirit of the invention. It is the intention, therefore, to be limited only as indicated by the following claims.

What is claimed is:

1. A head assembly for a recording apparatus adapted to perform magnetic transducing operations on a recording surface rapidly moving past the head assembly comprising, a head unit carrying a plurality of magnetic transducing heads, a flying pad cantilevered forward of the head unit, said flying pad having a leading surface portion angularly disposed relative to the recording surface for directing the moving air layer formed on the recording surface between the flying pad and recording surface to produce a lifting force for flying the flying pad in spaced relation to the recording surface, the relationship of the flying pad to the head unit maintaining an angular disposition of the head unit within the air layer to provide a lifting force on the head unit, and spring biasing means acting on the head unit against the lifting force to urge the head unit into the air layer to a desired spacing from the recording surface.

2. A head assembly for a recording apparatus as defined in claim 1 wherein the areal bearing surface configuration of the flying pad is of sufficient size to generate a substantially greater lifting force than the effective force of the spring biasing means transmitted from the head unit through the cantilever portion.

3. A head assembly for a recording apparatus as defined in claim 2 wherein the flying pad is disc-shaped with the greater portion of the surface area bearing against the air layer being disposed substantially coplanar to the recording surface with the leading portion of the surface area angled from said greater portion less than about a degree, the bottom surface of said head unit being substantially co-planar to the recording surface, and the cantilever interconnection between the head unit and the flying pad being substantially rigid.

4. A head assembly for a recording apparatus as defined in claim 1 wherein the spring biasing means is composed of at least one leaf spring having one end connected to the head unit and the other end affixed to and extended radially from a rotatably mounted supporting rod, and control means controlling the rotatable position of the supporting rod between a first position where the head unit is pivoted out of recording engagement with the recording surface, and a second position where the head unit is pivoted into recording engagement with the recording surface.

5. A head assembly for a recording apparatus as defined in claim 4 including an assembly bracket for rotatably mounting the supporting rod, assembly bracket positioning means for controlling the lateral position of the assembly bracket to position the transducing heads of the head unit in proximity to various recording tracks provided on the recording surface, pivotal means associated with the assembly bracket positioning means for pivoting the assembly bracket away from the recording surface, and control means for controlling the rotatable position of the supporting rod comprising a stationary cam surface, a cam follower carried by the assembly bracket adapted to engage the cam surface when the assembly bracket is pivoted away laterally from the recording surface, and linkage means interconnecting the supporting rod with the cam follower whereby as the cam follower engages the cam surface the rotatable rod is caused to rotate in a manner to unload the head units from the recording surface, and spring means for urging the opposite rotatable movement of the supporting rod to load the heads onto the recording surface when the cam follower is moved off the cam surface.

6. A head assembly for a recording apparatus adapted to perform magnetic transducing operations on a recording surface of a rapidly rotating disc comprising, an assembly bracket mounted for movement between an operative position and an inoperative position relative to the recording surface of the disc, a head unit, spring biasing means connecting the head unit to the assembly bracket, said spring biasing means adapted to spring bias the head unit toward the recording surface when the assembly bracket is in operative position, said head unit carrying a transducing head for performing transducing operations on the recording surface, and a flying pad cantilevered forward of the head unit adapted to fly on the moving air layer produced on the surface of the rotating disc.

7. A head assembly for a recording apparatus adapted to perform magnetic transducing operations on a recording surface of a rapidly rotating disc as defined in claim 6 wherein the spring biasing means comprises a leaf spring, a supporting rod rotatably mounted to the assembly bracket with the leaf spring having one end connected to and extending radially from the supporting rod and the other end connected to the head unit, and control means for controlling the rotatable movement of the supporting rod between a first position for loading the head unit onto the recording surface and a second position for unloading the head unit from the recording surface.

8. A head assembly for a recording apparatus adapted to perform magnetic transducing operations on a rapidly rotating disc as defined in claim 7 wherein the control means for controlling the rotatable movement of the supporting rod comprises a cam follower mounted to the assembly bracket and adapted to engage a cam surface when the assembly bracket is moved to its inoperative position, a linkage interconnecting the cam follower to the supporting rod for loading the head unit onto the record-cam surface the supporting rod is rotated for unloading the head unit from the recording surface, and spring means urging the opposite rotative movement to the supporting rod for loading the head unit onto the recording surface when the cam follower is disengaged from the cam surface.

9. A head assembly for a recording apparatus adapted to perform magnetic transducing operations on a recording surface of a rapidly rotating disc as defined in claim 6 wherein the flying pad is rigidly cantilevered forward of the head unit a sufficient distance to reduce the effect thereon of the spring biasing force whereby the lifting force applied against the flying pad by the moving air layer is substantially greater than the opposing effective force of the spring biasing means.

10. A head assembly for a recording apparatus adapted to perform magnetic transducing operations on a rapidly rotating disc as defined in claim 8 wherein the surface of the head unit bearing against the moving air layer and a trailing portion of the surface of the flying pad bearing against the moving air layer are substantially coplanar with the recording surface of the disc, and the leading portion of the surface of the flying pad is angled from said plane at an angle of less than one degree.

References Cited

UNITED STATES PATENTS

| 3,193,811 | 7/1965 | Clarke et al. | 340—174.1 |
| 3,197,751 | 7/1965 | Felts | 340—174.1 |
| 3,219,988 | 11/1965 | Miller et al. | 340—174.1 |

OTHER REFERENCES

Scheebeli, J. P.: "Flying Heal Loading Control," IBM Technical Disclosure Bulletin, vol. 9, No. 12, May 1967, p. 1746.

STANLEY M. URYNOWICZ, JR., Primary Examiner

W. F. WHITE, Assistant Examiner

U.S. Cl. X.R.

179—100.2; 346—74